United States Patent [19]

Hokama

[11] 3,923,849

[45] Dec. 2, 1975

[54] ALUMINUM SALTS OF 2-METHOXY-3,6-DICHLOROBENZOIC ACID

[75] Inventor: Takeo Hokama, Chicago, Ill.

[73] Assignee: Velsicol Chemical Corporation, Chicago, Ill.

[22] Filed: Oct. 29, 1973

[21] Appl. No.: 410,750

[52] U.S. Cl. .............................. 260/448 R; 71/115
[51] Int. Cl.² ........................................... C07F 5/06
[58] Field of Search ..................... 260/448 R, 448 B

[56] References Cited
UNITED STATES PATENTS

| | | | |
|---|---|---|---|
| 2,848,470 | 8/1958 | Girard et al. | 260/448 R |
| 2,965,662 | 12/1960 | Moser | 260/448 R |
| 3,154,575 | 10/1964 | Weil | 260/448 R X |
| 3,231,362 | 1/1966 | Pfeiffer | 71/115 X |

OTHER PUBLICATIONS
Chemical Abstracts, Vol. 56, 10049 def (1962).

Primary Examiner—Helen M. S. Sneed
Attorney, Agent, or Firm—Robert J. Schwarz; Dietmar H. Olesch

[57] ABSTRACT

This invention discloses new chemical compounds of the formula

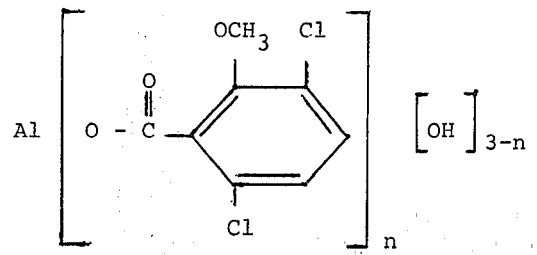

wherein $n$ is the integer 1 or 2. The compounds of the above description are useful as herbicides.

3 Claims, No Drawings

ALUMINUM SALTS OF 2-METHOXY-3,6-DICHLOROBENZOIC ACID

This invention relates to new compositions of matter and more specifically relates to new aluminum salts of the formula

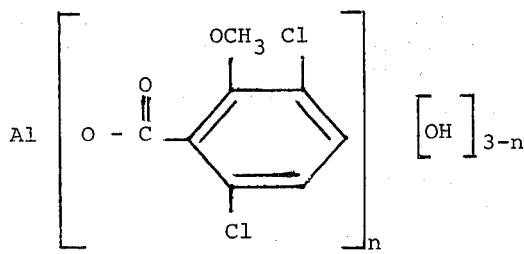

wherein $n$ is the integer 1 or 2.

The compounds of the present invention are useful as herbicides and possess the unexpected property of resisting leaching in the soil.

Weeds often grow near the soil surface whereas many beneficial plants have their roots deeper in the ground. Thus, to avoid injury to the beneficial plants which may be partially sensitive to a herbicide, it is desirable to minimize leaching or downward movement of the herbicide in the soil. Furthermore, a basis for the pre-emergence action of herbicides is often the difference in depth between the planted crop seeds and the weed seeds on the surface of the soil. Crop seeds are generally planted one to three inches deep and are somewhat protected from chemicals applied to the soil surface, while weed seeds generally germinate only in the top one-fourth inch of the soil and are thus subject to a much higher concentration of the chemical. To maintain this difference in concentration of the chemical, it is desirable to have a herbicide which is resistant to leaching in the soil. The compounds of the present invention resist leaching to a high degree.

The manner in which the compounds of the present invention can be prepared is more specifically illustrated in the following examples.

EXAMPLE 1

Preparation of $Al(C_6H_2OCH_3Cl_2CO_2)(OH)_2$

2-Methoxy-3,6-dichlorobenzoic acid (5.52 grams; 0.025 mole) was added to a solution of sodium hydroxide (3 grams; 0.075 mole) in water (50 ml) with stirring to obtain a solution of sodium 2-methoxy-3,6-dichlorobenzoate. This solution was then added to a solution of aluminum nitrate (9.38 grams; 0.025 mole) in water (100 ml) with vigorous stirring resulting in the formation of a precipitate. The precipitate was recovered by filtration, was washed with water and was dried in a vacuum oven at 100°C and aspirator pressure to yield the desired product $Al(C_6H_2OCH_3Cl_2CO_2)(OH)_2$.

EXAMPLE 2

Preparation of $Al(C_6H_2OCH_3Cl_2CO_2)_2(OH)$

2-Methoxy-3,6-dichlorobenzoic acid (11.05 grams; 0.05 mole) was added to a solution of sodium hydroxide (3 grams; 0.075 mole) in water (50 ml) with stirring to obtain a solution of sodium 2-methoxy-3,6-dichlorobenzoate. This solution was then added to a solution of aluminum nitrate (9.38 grams; 0.025 mole) in water (100 ml) with vigorous stirring resulting in the formation of a precipitate. The precipitate was recovered by filtration, was washed with water and was dried in a vacuum oven at 100°C and aspirator pressure to yield the desired product $Al(C_6H_2OCH_3Cl_2CO_2)_2(OH)$.

For practical use as herbicides the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders.

For example, dusts can be prepared by grinding and blending the active compound with a solid inert carrier such as the talcs, clays, silicas, pyrophyllite, and the like. Granular formulations can be prepared by impregnating the compound, usually dissolved in suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

A typical herbicidal composition according to this invention is illustrated by the following example, in which the quantities are in parts by weight.

EXAMPLE 3

Preparation of a Dust

| | |
|---|---|
| Product of Example 1 | 10 |
| Powdered Talc | 90 |

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, dessicants, growth inhibitors, and the like in the herbicidal compositions heretofore described. These other materials can comprise from about 5% to about 95% of the active ingredients in the herbicidal compositions. Use of combinations of these other herbicides and/or defoliants, dessicants, etc. with the compounds of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal compositions to control weeds, can include chlorophenoxy herbicides such as 2,4-D, 2,4,5-T, MCPA, MCPB, 4(2,4-DB), 2,4-DEB, 4-CPB, 4-CPA, 4-CPP, 2,4,5-TB, 2,4,5-TES, 3,4-DA, silvex and the like; carbamate herbicides such as IPC, CIPC, swep, barban, BCPC, CEPC, CPPC, and the like; thiocarbamate and dithiocarbamate herbicides such as CDEC, metham sodium, EPTC, diallate, PEBC, perbulate, vernolate and the like; substituted urea herbicides such as norea, siduron, dichloral urea, chloroxuron, cycluron, fenuron, monuron, monuron TCA, diuron, linuron, monolinuron, neburon, buturon, trimeturon and the like; symmetrical triazine herbicides such as simazine, chlorazine, atraone, desmetryne, norazine, ipazine, prometryn, atazine, trietazine, simetone, prometone, propazine, ametryne and the like; chloroacetamide herbicides such as alpha-chloro-N, N-dimethylacetamide, CDEA, CDAA, alpha-chloro-N-isopropylacetamide, 2-chloro-N-isopropylacetanilide, 4-(chloroacetyl)morpholine, 1-(chloroacetyl) piperidine, and the like; chlorinated aliphatic acid herbicides such as TCA, dalapon, 2,3-dichloropropionic acid, 2,2,3-TPA and the like; chlorinated benzoic acid and phenylacetic acid herbicides such as 2,3,6-TBA, 2,3,5,6-TBA, tricamba, amiben, fenac, PBA, 2-methoxy-3,6-dichlorophenylacetic acid, 3-methoxy-2,6-dichlorophenylacetic acid, 2-methoxy-3,5,6-trichlorophenylacetic acid, 2,4-dichloro-3-nitrobenzoic acid and the like; and such compounds as aminotriazole, maleic hydrazide, phenyl mercuric acetate, endothal, biuret, technical chlordane, dimethyl 2,3,5,6-tetrachloroterephthalate, diquat, erbon, DNC, DNBP, dichlobenil, DPA, diphenamid, dipropalin, trifluralin, solan, dicryl, merphos, DMPA, DSMA, MSMA, potassium azide, acrolein, benefin, bensulide, AMS, bromacil, 2(3,4-dichlorophenyl)-4-methyl-1,2,4-oxabdiazolidine-3,5-dione, bromoxynil, cacodylic acid, CMA, CPMF, cypromid, DCB, DCPA, dichlone, diphenatril, DMTT, DNAP, EBEP, EXD, HCA, ioxynil, IPX, isocil, potassium cyanate, MAA, MAMA, MCPES, MCPP, MH, molinate, NPA, OCH, paraquat, PCP, picloram, DPA, PCA, pyrichlor, sesone, terbacil, terbutol, TCBA, brominil, CP-50144, H-176-1, H-732, M-2901, planavin, sodium tetraborate, calcium cyanamide, DEF, ethyl xanthogen disulfide, sindone, sindone B, propanil and the like.

Such herbicides can also be used in the methods and compositions of this invention in the form of their salts, esters, amides and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known, including annuals such as pigweed, lambsquarters, foxtail, crabgrass, wild mustard, field pennycress, ryegrass, goose-grass, chickweed, wild oats, velvet leaf, purselane, barnyard grass, smartweed, knotweed, cocklebur, wild buckwheat, kochia, medic, corn cockle, ragweed, sowthistle, coffee-weed, croton, cuphea, dodder, fumitory, groundsel, hemp nettle, knowel, spurge, spurry, emex, jungle rice, pondweed, dog fennel, carpetweed, morning glory, bedstraw, ducksalad and naiad; biennials such as wild carrot, matricaria, wild barley, campion, chamomile, burdock, mullein, round-leaved mallow, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, curly dock, nutgrass, field chickweed, dandelion, campanula, field bindweed, Russian knapweed, mesquite, toadflax, yarrow, aster, gromwell, horsetail, ironweed, sesbania, bulrush, cattail and winter-cress.

Similarly, such weeds can be classfied as broadleaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the application of up to only about one or two ounces of active compound per acre may be sufficient for good control of a light infestation of weeds growing under adverse conditions, the application of 10 pounds or more of an active compound per acre may be required for good control of a dense infestation of hardy perennial weeds growing under favorable conditions.

The herbicidal toxicity of the new compounds of this invention can be illustrated by many of the established testing techniques known to the art, such as pre- and post- emergence testing.

The herbicidal activity of the compounds of this invention can be demonstrated by experiments carried out for the pre-emergence control of a veriety of weeds. In these experiments small plastic greenhouse pots filled with dry soil are seeded with the various weed seeds. Twenty-four hours or less after seeding the pots are sprayed with water until the soil is wet and the test compounds formulated as aqueous emulsions of acetone solutions containing emulsifiers are sprayed at the desired concentrations on the surface of the soil.

After spraying, the soil containers are placed in the greenhouse and provided with supplementary heat as required and daily or more frequent watering. The plants are maintained under these conditions for a period of from 15 to 21 days, at which time the condition of the plants and the degree of injury to the plants is rated on a scale of from 0 to 10, as follows: 0 = no injury, 1,2 = slight injury, 3,4 = moderate injury, 5,6 = moderately severe injury, 7,8,9 = severe injury and 10 = death. The effectiveness of the compounds of this invention can be demonstrated by the foregoing procedure.

The herbicidal activity of the compounds of this invention can also be demonstrated by experiments carried out for the post-emergence control of a variety of weeds. In these experiments the compounds to be tested are formulated as aqueous emulsions and sprayed at the indicated dosage on the foliage of the various weed species that have attained a prescribed size. After spraying, the plants are placed in a greenhouse and watered daily or more frequently. Water is not applied to the foliage of the treated plants. The severity of the injury is determined 10 to 15 days after treatment and is rated on the scale of from 0 to 10 heretofore described.

The resistance to leaching of the compounds of the present invention was demonstrated in experiments wherein the migration of the compounds of this invention through soil was measured. In these experiments a plastic column was packed with soil which had previously been dried and passed through a 30 mesh screen. The column was packed to a soil depth of 3 inches. The test compounds were then applied to the soil surface in the form of a solid powder and water (284 ml) equivalent to 6 inches of rainfall was then poured on top of the soil column in a single addition. The column was allowed to stand for a period of 24 hours during which time the water slowly eluted from the bottom of the column was collected. The water eluant was then analyzed for for the amount of test compound present. The aqueous solution was concentrated and hydrolyzed with 50% aqueous hydrochloric acid. The acidified solution was extracted with chloroform and analyzed by quantitative infra-red analysis as 2-methoxy-3,6-dichlorobenzoic acid. The stoichiometric conversion and subsequent analysis for the test compound in the water eluant indicated the amount of test compound which had passed through the soil column and is a measure of the degree of leaching of the test compound in soil. For comparative purposes, the identical leaching experiment was carried out using the dimethylamine salt of 2-methoxy-3,6-dichlorobenzoic acid. The result of these experiments is shown in the following table.

| Test Compound | Physical State on Application | Amount of Test Compound Applied to the Soil Expressed as Dicamba* | % Test Compound Present in the Water Eluant Based on Amount Applied to the Soil Expressed as Dicamba* |
| --- | --- | --- | --- |
| Product of Example 1 | solid powder | $3.50 \times 10^{-3}$ | <0.2 |
| Product of Example 2 | solid powder | $3.20 \times 10^{-3}$ | 16.8 |
| Dimethylamine Salt of 2-Methoxy-3,6-dichlorobenzoic Acid | aqueous solution | $3.10 \times 10^{-3}$ | 103.6 |

*Dicamba = 2-methoxy-3,6-dichlorobenzoic acid

I claim:
1. A compound of the formula

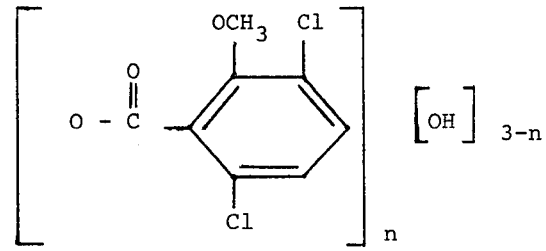

wherein $n$ is the integer 1 or 2.

2. The compound of claim 1, $Al(C_6H_2OCH_3Cl_2CO_2)(OH)_2$.

3. The compound of claim 1, $Al(C_6H_2OCH_3Cl_2CO_2)_2(OH)$.

* * * * *